United States Patent [19]
Bödiger et al.

[11] Patent Number: 5,849,827
[45] Date of Patent: Dec. 15, 1998

[54] EXTREMELY FINELY DIVIDED INORGANIC POWDERS AS FLAME RETARDANTS IN THERMOPLASTIC MOULDING COMPOSITIONS

[75] Inventors: Michael Bödiger; Thomas Eckel, both of Dormagen; Dieter Wittmann, Leverkusen; Heinrich Alberts, Odenthal, all of Germany

[73] Assignee: Bayer AG, Germany

[21] Appl. No.: 693,612

[22] Filed: Aug. 7, 1996

[30] Foreign Application Priority Data

Aug. 17, 1995 [DE] Germany ............... 195 30 200.1

[51] Int. Cl.⁶ ............... C08K 3/30
[52] U.S. Cl. ............... 521/423
[58] Field of Search ............... 524/423, 604, 524/605, 611

[56] References Cited

U.S. PATENT DOCUMENTS

| | | | |
|---|---|---|---|
| 4,983,658 | 1/1991 | Kress et al. | 524/141 |
| 5,026,758 | 6/1991 | Grigo et al. | 524/423 |
| 5,030,675 | 7/1991 | Wittmann et al. | 524/130 |
| 5,204,394 | 4/1993 | Gosens et al. | 524/125 |

FOREIGN PATENT DOCUMENTS

| | | |
|---|---|---|
| 0209033 | 1/1987 | European Pat. Off. . |
| 0416407 | 3/1991 | European Pat. Off. . |
| WO 93/09169 | 5/1993 | WIPO . |

*Primary Examiner*—Terressa Mosley
*Attorney, Agent, or Firm*—Connolly & Hutz

[57] ABSTRACT

Thermoplastic molding compositions containing:

A. A thermoplastic polymer of ethylenically unsaturated monomers or a polycondensate of bifunctional reactive compounds, B. 0.01 to 50, preferably 0.1 to 10 parts by weight per 100 parts by weight of (A) of extremely finely divided inorganic powder with a mean particle diameter of 1 to 200 nm, preferably 1 to 150 nm, in particular 1 to 100 nm and C. 0.1 to 50, preferably 0.5 to 20 parts by weight per 100 parts by weight of (A) of flame retardant.

21 Claims, No Drawings

EXTREMELY FINELY DIVIDED INORGANIC POWDERS AS FLAME RETARDANTS IN THERMOPLASTIC MOULDING COMPOSITIONS

The invention relates to thermoplastic moulding compositions containing thermoplastic polycarbonates, extremely finely divided inorganic powders and flame retardants.

Thermoplastic polymers and mixtures of various thermoplastic polymers play an important role as the main constituent of construction materials. The majority of these materials contain additives, e.g. stabilizers, pigments, mould release agents, flame retardants, antistatic agents.

As flame retardants for thermoplastic polycarbonates use is conventionally made of halogen compounds, phosphorus compounds or salts of organic acids, for example of sulphonic acid.

EP 0 174 493 (U.S. Pat. No. 4,983,658) e.g. describes flame-proofed halogen-containing polymer mixtures of aromatic polycarbonate, styrene-containing graft polymer, monophosphates and a special polytetrafluoroethylene formulation.

U.S. Pat. No. 5,030,675 describes flame-resistant, thermoplastic moulding compositions of aromatic polycarbonate, ABS polymer, polyalkylene terephthalate with monophosphates and fluorinated polyolefins as flame retardants.

Diphosphates are also known as flame retardants. J-A 59 202 240 describes the manufacture of such a diphosphate consisting of phosphoroxy chloride, diphenols (e.g. hydroquinone, bisphenol A) and monophenols (e.g. phenol, cresol). These diphosphates can be used as flame retardants in polyamide or polycarbonate.

Mixtures of aromatic polycarbonate, styrene-containing copolymer or graft copolymer with oligomeric phosphates as flame retardants are described in EP-A 0 363 608 (=U.S. Pat. No. 5,204,394) and mixtures of aromatic polycarbonate, ABS graft polymer and/or styrene-containing copolymer with monophosphates as flame retardants in U.S. Pat. No. 5,061,745.

Extremely finely divided inorganic substances are used industrially for various purposes, e.g. for manufacturing transparent materials for optical applications (lenses), cf. FR-A 2 682 389, scratch-proof coatings (J-A 03 279 210), conductive coatings (J-A 05 239 409 and J-A 04 303 937) and as fillers for plastics materials (DD 296 897, DE-A 4 124 588 and J-A 02 188 421). The use of these extremely finely divided inorganic substances in combination with flame retardants in polycarbonate moulding compositions has not yet been described in the literature.

This invention is based on the finding that an addition of extremely finely divided inorganic powders together with flame retardants in thermoplastic polycarbonate moulding compositions produces a significant reduction in the burning times and hence a considerable improvement in the flame proofing.

The invention provides thermoplastic moulding compositions containing:

A. A thermoplastic polycarbonate
B. 0.01 to 50, preferably 0.1 to 10 parts by weight per 100 parts by weight of (A) of extremely finely divided inorganic powder with a mean particle diameter of 0.1 to 100 nm, preferably 1 to 50 nm, in particular 1 to 30 nm
and
C. 0.1 to 50, preferably 0.5 to 20 parts by weight per 100 parts by weight of (A) of flame retardant.

Thermoplastic Polycarbonates A

Preferred polycarbonates are those based on the diphenols of formula (I)

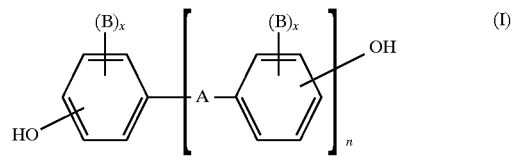

where

A is a single bond, a $C_1$–$C_5$-alkylene, a $C_2$–$C_5$-alkylidene, a $C_5$–$C_6$-cycloalkylidene, —S— or —$SO_2$—, B chlorine, bromine X 0, 1 or 2 and n 1 or 0.

Polycarbonates suitable according to the invention are both homopolycarbonates and copolycarbonates.

A can also be a mixture of the thermoplastic polycarbonates defined above.

Polycarbonates can be manufactured in known manner from diphenols with phosgene by the phase boundary method or with phosgene by the method in homogeneous phase, the so-called pyridine method, wherein the molecular weight can be set in known manner by a suitable quantity of known chain terminators.

Suitable chain terminators are e.g. phenol, p-chlorophenol, p-tert.-butylphenol or 2,4,6-tribromophenol, and also long-chain alkylphenols, such as 4-(1,3-tetramethylbutyl)-phenol according to DE-OS 2 842 005 (Le A 19 006) or monoalkylphenol or dialkylphenol with a total of 8–20 carbon atoms in the alkyl substituents according to German patent application P 3 506 472.2 (Le A 23 654), such as 3,5-di-tert.-butylphenol, p-iso-octylphenol, p-tert.-octylphenol, p-dodecylphenol and 2-(3,5-dimethylheptyl)-phenol and 4-(3,5-dimethyl-heptyl)-phenol.

The quantity of chain terminators comes in general to between 0.5 and 10 mol. % referred to the sum of the diphenols (I) used.

The polycarbonates A suitable according to the invention have mean molecular weights ($\overline{M}$w, weight average, measured e.g. by ultracentrifuging or scattered light measurement) of 10 000 to 200 000, preferably of 20 000 to 80 000.

Suitable diphenols of formula (I) are e.g. hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dibromo-4-hydroxyphenyl)-propane.

Preferred diphenols of formula (I) are 2,2-bis-(4-hydroxyphenyl)-propane, 2,2-bis-(3,5-dichloro-4-hydroxyphenyl)-propaneandl, 1-bis-(4-hydroxyphenyl)-cyclohexane.

Preferred diphenols are also alkyl-substituted dihydroxydiphenylcycloalkanes of formula (II):

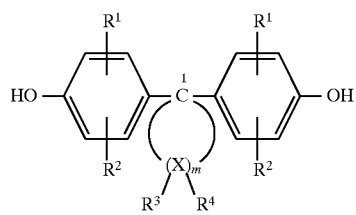

where
- $R^1$ and $R^2$ signify independently of one another hydrogen, halogen, preferably chlorine or bromine, $C_1$–$C_8$-alkyl, $C_5$–$C_6$-cycloalkyl, $C_6$–$C_{10}$-aryl, preferably phenyl, and $C_7$–$C_{12}$-aralkyl, preferably phenyl-$C_1$–$C_4$-alkyl, in particular benzyl,
- m signifies a whole number from 4 to 7, preferably 4 or 5,
- $R^3$ and $R^4$ signify, individually selectably for each X and independently of one another, hydrogen or $C_1$–$C_6$-alkyl
- X signifies carbon, on condition that on at least one X atom $R^3$ and $R^4$ signify simultaneously alkyl.

The polycarbonates A suitable according to the invention can be branched in known manner, namely preferably by the inclusion of 0.05 to 2.0 mol. %, referred to the sum of the diphenols used, of tri- or more than trifunctional compounds, e.g. those with three or more than three phenol groups.

Preferred polycarbonates A are, in addition to the bisphenol-A-homopolycarbonate, the copolycarbonates of bisphenol A with up to 15 mol. %, referred to the mole totals of diphenols, of 2,2-bis-(3,5-dibromo4-hydroxyphenyl)-propane. Preferred polycarbonates are, in addition to the bisphenol A-homopolycarbonate, polycarbonate/siloxane block copolymers.

The polycarbonates A can be replaced partly or wholly by aromatic polyester carbonates.

The thermoplastic polycarbonates can be replaced partly by homopolymers or copolymers of ethylenically unsaturated monomers. Mixtures of different homo- or copolymers are also suitable.

Examples of homopolymers and copolymers of one or more ethylenically unsaturated monomers ("vinyl polymers") are those of the monomers ethylene, propylene, vinyl acetate, styrene, α-methyl styrene, styrenes substituted in the ring, acrylonitrile, methacrylonitrile, methyl methacrylate, maleic acid anhydride, N-substituted maleinimides, chloroprene, 1,3-butadiene, isopropene, $C_1$–$C_{18}$-alkyl acrylates and methacrylates.

The following in particular are considered:
rubber-free vinyl polymers (A.1)
rubber-containing vinyl polymers, e.g. graft polymers of vinyl monomers on a rubber (A.2)
mixtures of rubber-free (A.1) and rubber-containing (A.2) vinyl polymers.

Preferred vinyl polymers A.1 are copolymers of on the one hand styrene, α-methyl styrene, styrene substituted in the ring or mixtures (A.1.1) and on the other hand acrylonitrile, methacrylonitrile, methyl methacrylate, maleic acid anhydride, N-substituted maleinimide or mixtures (A.1.2).

Preferably these copolymers contain 50 to 98 wt. % of A.1.1 and 50 to 2 wt. % of A.1.2.

Particularly preferred copolymers A.1 are those of styrene, acrylonitrile and optionally methyl methacrylate, of α-methyl styrene, acrylonitrile and optionally methyl methacrylate and of styrene, α-methyl styrene, acrylonitrile and optionally methyl methacrylate.

The most well known are styrene-acrylonitrile copolymers, which can be manufactured by radical polymerisation, in particular by emulsion, suspension, solution or bulk polymerisation. The copolymers A.1 possess preferably molecular weights $\overline{M}w$ (weight average, determined by scattered light measurement or sedimentation) of 15 000 to 200 000.

Other particularly preferred copolymers A.1 are statistically composed copolymers of styrene and maleic acid anhydride, which can be manufactured e.g. by a continuous bulk or solution polymerisation with incomplete conversions from the corresponding monomer. Their composition can be varied within wide limits. They preferably contain 5 to 25 wt. % of maleic acid anhydride units.

Instead of styrene these polymers can also contain styrenes substituted in the ring, such as p-methyl styrene, vinyl toluene, 2,4-dimethyl styrene and other substituted styrenes, such as α-methyl styrene.

The rubber-containing vinyl polymers A.2 include e.g. graft copolymers with rubber-elastic properties, which are obtainable in the main from at least two of the following monomers: chloroprene, 1,3-butadiene, isopropene, styrene, acrylonitrile, ethylene, propylene, vinyl acetate, $C_1$–$C_{18}$-alkyl acrylates and methacrylates. Such polymers are described e.g. in "Methoden der Organischen Chemie" (Houben-Weyl), Vol. 14/1, Georg Thieme-Verlag, Stuttgart, 1961, pp. 393–406 and in C. B. Bucknall, "Toughened Plastics", Appl. Science Publishers, London 1977. Preferred polymers A.2 are partially crosslinked and possess gel contents of more than 20 wt. %, preferably more than 40 wt. %, in particular more than 60 wt. %.

Preferred rubber-type vinyl polymers A.2 are graft polymers of:
- A.2.1 5 to 95, preferably 30 to 80, parts by weight of a mixture of
  - A.2.1.1 50 to 95 parts by weight of styrene, α-methyl styrene, styrenes substituted in the halogen or methyl ring, methyl methacrylate or mixtures of these compounds and
  - A.2.1.2 5 to 50 parts by weight of acrylonitrile, methacrylonitrile, methyl methacrylate, maleic acid anhydride, $C_1$–$C_4$-alkyl- or phenyl-N-substituted maleinimides or mixtures of these compounds on
- A.2.2 5 to 95, preferably 20 to 70, parts by weight of rubber polymer with a glass transition temperature of less than −10° C.

Preferred graft polymers A.2 are e.g. polybutadienes, butadiene/styrene copolymers and polyacrylate rubbers grafted with styrene and/or acrylonitrile and/or alkyl acrylates or methacrylates, i.e. copolymers of the kind described in DE-OS 1 694 173 (=U.S. Pat. No. 3,564,077; polybutadienes, butadiene/styrene or butadiene/acrylonitrile copolymers, polyisobutene or polyisoprene grafted with acrylic or methacrylic acid alkyl esters, vinyl acetate, acrylonitrile, styrene and/or alkyl styrenes, such as are described e.g. in DE-OS 2 348 377 (=U.S. Pat. No. 3,919, 353).

Particularly preferred polymers A.2 are ABS polymers, such as are described e.g. in DE-OS 2 035 390 (=U.S. Pat. No. 3,644,574) and in DE-OS 2 248 242 (=GB-PS 1 409 275).

Particularly preferred polymers A.2 are obtainable by the graft polymerisation of
- α 10 to 70, preferably 15 to 50, in particular 20 to 40 wt. %, referred to graft polymer A.2, of acrylic acid esters or methacrylic acid esters or from 10 to 70, preferably 15 to 50, in particular 20 to 40 wt. % of a mixture of 10 to 50, preferably 20 to 35 wt. %, referred to mixture, of acrylonitrile, acrylic acid ester or methylic acid ester and 50 to 90, preferably 65 to 80 wt. %, referred to mixture, of styrene (as graft covering A.2.1) on β 30 to 90, preferably 50 to 85, in particular 60 to 80 wt. %, referred to graft polymer A.2, of a butadiene polymer with at least 50 wt. %, referred to β, of butadiene radicals (as graft base A.2.2), wherein preferably the gel content of the graft base β comes to at least 70 wt. % (measured in toluene), the grafting degree G to 0.15 to 0.55 and the mean particle diameter $d_{50}$ of the graft polymer A.2 to 0.05 to 2 μm, preferably 0.1 to 0.6 μm.

Acrylic acid ester and methacrylic acid ester α are esters of acrylic acid or methacrylic acid and monovalent alcohols with 1 to 18 carbon atoms. Particularly preferred are methyl methacrylate, ethyl methacrylate, propyl methacrylate, n-butyl acrylate, t-butyl acrylate and t-butyl methacrylate.

The butadiene polymer β can in addition to butadiene radicals contain up to 50 wt.%, referred to β, of other ethylenically unsaturated monomers, such as styrene, acrylonitrile, $C_1$–$C_4$-alkyl esters or acrylic or methacrylic acid (such as methyl acrylate, ethyl acrylate, methyl methacrylate, ethyl methacrylate), vinyl esters and/or vinyl ethers). Polybutadine is preferred.

During the graft polymerisation the graft polymers, as is known, are not polymerised completely onto the graft base, but according to the invention graft polymers A.2 include products which are obtained by polymerisation of the graft polymers in the presence of the graft base.

The grafting degree G is the ratio by weight of grafted-on graft monomers to the graft base (dimensionless number).

The mean particle diameter $d_{50}$ is the diameter above and below which 50 wt. % respectively of the particles lie. It can be determined by means of ultracentrifuge measurement (W. Scholtan, H. Lange, Kolloid, Z. und Z. Polymere 250 (1972), 782–796).

Other particularly preferred polymers A.2 are graft polymers of

τ 20 to 90 wt. %, referred to A.2, of polyacrylate rubber with a glass transition temperature of less than –20° C. as graft base A.2.2 and δ 10 to 80 wt. %, referred to A.2, of at least one polymerisable, ethylenically unsaturated monomer, whose homo- or copolymers obtained in the absence of 1. would have a glass transition temperature of more than 25° C., as graft monomers A.2.1.

The polyacrylate rubbers τ of the polymers A.2 are preferably polymers of acrylic acid alkyl esters, optionally with up to 40% by weight, referred to τ, of other polymerisable, ethylenically unsaturated monomers. The preferred polymerisable acrylic acid esters include $C_1$–$C_8$-alkyl esters, for example methyl, ethyl, butyl, n-octyl and 2-ethyl-hexyl esters, halogen alkyl esters, preferably halogen-$C_1$–$C_8$-alkyl esters, such as chloroethyl acrylate, as well as mixtures of these monomers.

Monomers with more than one polymerisable double bond can be copolymerised for the crosslinking. Preferred examples of crosslinking monomers are esters of unsaturated monocarboxylic acids with 3 to 8 carbon atoms and of unsaturated monovalent alcohols with 3 to 12 carbon atoms or of saturated polyols with 2 to 4 OH groups and 2 to 20 carbon atoms, such as ethylene glycol dimethacrylate, allyl methacrylate, polyunsaturated heterocyclic compounds, such as trivinyl and triallyl cyanurate, polyfunctional vinyl compounds, such as di- and trivinylbenzenes, and also triallyl phosphate and diallyl phthalate.

Preferred crosslinking monomers are allyl methacrylate, ethylene glycol dimethacrylate, diallyl phthalate and heterocyclic compounds which have at least 3 ethylenically unsaturated groups.

Particularly preferred crosslinking monomers are the cyclic monomers triallyl cyanurate, triallyl isocyanurate, trivinyl cyanurate, triacrylolhexahydro-s-triazine, triallylbenzenes.

The quantity of the monomers to be crosslinked comes preferably to 0.02 to 5, in particular 0.05 to 2 wt. %, referred to the graft base τ.

In the case of cyclic cross-linking monomers with at least 3 ethylenically unsaturated groups it is advantageous to limit the amount to less than 1 wt. % of the graft base τ.

Preferred "other" polymerisable, ethylenically unsaturated monomers which can serve together with the acrylic acid esters optionally for the manufacture of the graft base are e.g. acrylonitrile, styrene, α-methyl styrene, acryl amide, vinyl-$C_1$–$C_6$-alkyl ether, methyl methacrylate, butadiene. Preferred polyacrylate rubbers as graft base τ are emulsion polymers which have a gel content of at least 60 wt. %.

Other suitable graft bases as per A.2.2 are silicone rubbers with graft-active sites, such as are described in DE-OS 37 04 657, DE-OS 37 04 655, DE-OS 36 31 540 and DE-OS 36 31 539.

The gel content of the graft base A.2.2 is determined at 25° C. in dimethyl formamide (M. Hoffmann, H. Krömer, R. Kuhn, Polymeranalytik I and II, Georg-Thieme-Verlag, Stuttgart 1977).

The graft polymers A.2 can be manufactured by known methods such as bulk, suspension, emulsion or bulk-suspension methods.

The polycarbonates A can be replaced partly by polyesters.

Preferred polyesters are polyalkylene terephthalates. These are reaction products of aromatic dicarboxylic acids (or their reactive derivatives, e.g. dimethyl esters or anhydrides) and aliphatic, cycloaliphatic or arylaliphatic diols and mixtures of such reaction products.

Preferred polyalkylene terephthalates can be produced from terephthalic acids (or their reactive derivatives) and aliphatic and cycloaliphatic diols with 2 to 10 carbon atoms by known methods (Kunststoff-Handbuch), Vol. VIII, p. 695 ff, Carl Hanser Verlag, Munich 1973).

Preferred polyalkylene terephthalates contain 80 to 100, preferably 90 to 100 mol. %, referred to the dicarboxylic acid component, of terephthalic acid residues and 80 to 100, preferably 90 to 100 mol. %, referred to the diol component, of ethylene glycol and/or 1,4-butanediol residues. In addition to terephthalic acid residues, 0 to 20 mol. % of residues of other aromatic dicarboxylic acids with 8 to 14 carbon atoms or aliphatic dicarboxylic acids with 4 to 12 carbon atoms are incorporated, such as residues of phthalic acid, isophthalic acid, naphthalene-2,6-dicarboxylic acid, 4,4'-diphenyldicarboxylic acid, succinic, adipic, sebacic, azelaic or cyclohexanediacetic acid. In addition to ethylene glycol and/or 1,4-butanediol residues, 0 to 20 mol. % of other aliphatic diols with 3 to 12 carbon atoms or cycloaliphatic diols with 6 to 12 carbon atoms are incorporated, e.g. residues of 1,5-pentanediol, 1,6- hexanediol, 1,4-cyclohexanedimethanol, 3-methylpentanediol-1,3 and -1,6, 2-ethylhexanediol-1,3,2,2-diethylpropanediol-1,3,2,5-hexanediol, 1,4-di(β-hydroxyethoxyphenyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane (DE-OS 2 407 647, 2 407 776, 2 715 932).

The polyalkylene terephthalates can be branched by the inclusion of relatively small amounts of 3- or 4-valent alcohols or 3- or 4-basic carboxylic acids. such as are described in DE-OS 1 900 270 and U.S. Pat. No. 3,692,744. Examples of preferred branching agents are trimesic acid, trimellitic acid, trimethylolethane and -propane and pentaerythritol. It is advisable not to use more than 1 mol. % of the branching agent, referred to the acid component.

Particularly preferred are polyalkylene terephthalates which have been produced solely from terephthalic acid (or its reactive derivatives, e.g. its dialkyl esters) and ethanediol and/or 1,4-butanediol as well as their mixtures.

Preferred polyalkylene terephthalates are also copolyesters which are produced from at least two of the above-mentioned diols; particularly preferred copolyesters are poly-(ethylene glycol/1,4-butanediol)-terephthalates. The various diol groups can be present in the copolyesters in the form of blocks or distributed statistically.

The polyalkylene terephthalates possess in general an intrinsic viscosity of 0.4 to 1.4 dl/g, preferably 0.5 to 1.3 dl/g, in particular 0.6 to 1.2 dl/g, measured in each case in phenol/o-dichlorobenzene (1:1 parts by weight) at 25° C.

Extremely Finely Divided Inorganic Powder B

Consisting of one or more metals of the 1st to 5th main group and 1st to 8th sub-group of the periodic system, preferably 2nd to 5th main group and 4th to 8th sub-group, particularly preferably 3rd to 5th main group and 4th to 8th sub-group or of compounds of these metals with the elements oxygen, carbon, nitrogen, hydrogen, sulfur and silicon.

Preferably the extremely finely divided inorganic powders consist of TiN, $TiO_2$, $SiO_2$, $SnO_2$, WC, ZnO, boehmite, $ZrO_2$, $Al_2O_3$, aluminium phosphates, iron oxides. Mixtures and doped compounds can also be used.

Particularly preferred are aluminium oxides, e.g. boehmite, $TiO_2$ and TiN.

The powder can be worked into the thermoplastic plastics materials A by conventional methods, for example by direct mixing or extruding of plastics material A and the extremely finely divided inorganic powders. Preferred methods are the production of a master batch, e.g. in flame retardants and other additives, monomers or solvents, or the co-precipitation of thermoplastics A and the extremely finely divided inorganic powders, e.g. by co-precipitation of an aqueous emulsion and the extremely finely divided inorganic powders.

The mean particle diameters are 0.1 to 100 nm, preferably 1 to 50 nm, in particular 1 to 30 nm.

Particle size and particle diameter always means the average particle diameter $d_{50}$, determined by ultracentrifuge measurements according to W. Scholtan et al., Kolloid-Z. und Z. Polymere 250 (1972), pp. 782 to 796.

Additives C

Additives C within the meaning of the invention are flame retardants. Both halogen-containing and halogen-free compounds are suitable in this context.

Suitable halogen compounds are organic chlorine and/or bromine compounds which are stable during the production and processing of the moulding compositions according to the invention, so that no corrosive gases are released and the effectiveness is not thereby impaired.

Halogen-containing additives C are for example
1. Chlorinated and brominated diphenyls, such as octachlorodiphenyl, deca-chlorodiphenyl, octabromodiphenyl, decabromodiphenyl.
2. Chlorinated and brominated diphenyl ethers, such as octa- and deca-chlorodiphenyl ether and octa- and decabromodiphenyl ether.
3. Chlorinated and brominated phthalic acid anhydride and its derivatives, such as phthalimides and bisphthalimides, e.g. tetrachloro- and tetrabromophthalic acid anhydride, tetrachloro- and tetrabromophthalimide, N,N'-ethylene-bis-tetrachloro- and N,N'-ethylene-bis-tetrabromophthalimide, N-methyltetra-chloro- and N-methyltetrabromophthalimide.
4. Chlorinated and brominated bisphenols, such as 2,2-bis-(3,5-di-chloro4-hydroxyphenyl)-propane and 2,2-bis-(3,5-di-bromo-4-hydroxyphenyl)-propane.
5. 2,2-bis-(3,5-di-chloro-4-hydroxyphenyl)-propane-oligocarbonate and 2,2-bis-(3,5-di-bromo-4-hydroxyphenyl)-propane-oligocarbonate with an average polycondensation degree of 2–20.

Bromine compounds are preferred to the chlorine compounds and halogen-free compounds to the latter.

Preferably suitable as flame retardants C are all phosphorus compounds conventionally used for the latter, in particular phosphine oxides and derivatives of acids of phosphorus and salts of acids and acid derivatives of phosphorus.

Preferred are derivatives (e.g. esters) of acids of phosphorus and their salts, wherein acids of phosphorus includes phosphoric acid, phosphonic acid, phosphinic acid, phosphorous acid, including in dehydrated form in each case, salts are preferably alkali metal, alkaline earth metal and ammonium salts of these acids and also their derivatives (for example partly esterified acids).

Particularly preferred phosphorus compounds are those of formula (VIII)

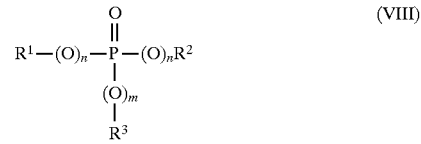

in which $R^1$, $R^2$ and $R^3$ are independently of one another an optionally halogenated $C_1$–$C_8$-alkyl or an optionally halogenated and/or alkylated $C_5$- or $C_6$-cycloalkyl or an optionally halogenated and/or alkylated and/or aralkylated $C_6$–$C_{30}$-aryl, and "n" and "m" are independently of one another 0 or 1.

These phosphorus compounds are widely known (see for example Ullmann, Enzyklopädie der technischen Chemie. Vol. 18, pages 301 ff, 1979). The aralkylated phosphorus compounds are for example described in DE-OS 38 24 356.0.

Optionally halogenated $C_1$–$C_8$-alkyl radicals as per (VIII) can be mono- or polyhalogenated, linear or branched. Examples of alkyl radicals are chloroethyl, 2-chloropropyl, 2,3-dibromopropyl, butyl, methyl or octyl.

Optionally halogenated and/or alkylated $C_5$- or $C_6$-cycloalkyls as per (VIII) are optionally mono- to polyhalogenated and/or alkylated $C_5$ or -$C_6$-cycloalkyls, for example cyclopentyl, cyclohexyl, 3,3,5-trimethylcyclohexyl and fully chlorinated cyclohexyl.

Optionally halogenated and/or alkylated and/or aralkylated $C_6$–$C_{30}$-aryl radicals as per (VIII) are optionally mono- or polynuclear, mono- or polyhalogenated and/or alkylated and/or aralkylated, e.g. chlorophenyl, bromophenyl, pentachlorophenyl, pentabromophenyl, phenyl, cresyl, isopropylphenyl, benzyl-substituted phenyl and naphthyl.

Phosphorus compounds as per formula (VIII) which are useable according to the invention are e.g. tributyl phosphate, tris-(2-chloroethyl)phosphate, tris-(2,3-dibromopropyl)-phosphate, triphenyl phosphate, tricresyl phosphate, diphenylcresyl phosphate, diphenyloctylphosphate, diphenyl-2-ethylcresylphsophate, tri-(isopropylphenyl)phosphate, tris-(p-benzylphenyl) phosphate, triphenylphosphine oxide, methanephosphonic acid dimethyl ester, methanephosphonic acid dipentyl ester and phenylphosphonic acid diethyl ester.

Suitable flame retardants are also dimeric and oligomeric phosphates whose molecular weight is less than 2000 g/mol, preferably less than 1000 g/mol. These are described for example in EP-A 0 363 608.

The moulding compositions according to the invention can contain conventional amounts of additional additives, glass fibres or polymers that cannot be processed like thermoplastics, such as polytetrafluoroethylene for example.

The moulding compositions according to the invention can be produced by mixing the ingredients in known manner and melt-compounding or melt-extruding them at elevated temperatures, preferably at 200° to 350° C., in conventional units, such as internal mixers, extruders or twin-shafted screws. The ingredients can be mixed sequentially or simultaneously. In particular cases it may be beneficial to produce pre-mixtures from the low-molecular weight additives and the magnesium-aluminium silicates.

The invention therefore also provides a method for producing the moulding compositions described by mixing the components at elevated temperature.

The moulding compositions according to the invention can be used to produce mouldings of any kind, e.g. by injection moulding. Examples of mouldings are: barrel sections (e.g. for household appliances such as fruit presses, coffee machines, mixers), cover plates for the building trade or car parts. They are also used for electrical appliances, e.g. for multipoint connectors, because they have very good electrical properties.

Mouldings can also be produced by deep drawing from previously produced slabs or sheets.

The invention therefore also provides the use of the moulding compositions described to produce mouldings.

EXAMPLES

Thermoplastic Polycarbonates

A1 Linear bisphenol A-polycarbonate with a relative solution viscosity of 1.286 (measured in $CH_2Cl_2$ at 25° C. and in a concentration of 0.5 g/100 ml.

A2 Styrene/acrylonitrile-copolymer (styrene/acrylonitrile ratio by weight 72:28) with an intrinsic viscosity of 0.55 dl/g (measurement in dimethylformamide at 20° C.).

A3 Graft polymer of 45 parts by weight of styrene and acrylonitrile in the ratio 72:28 on 55 parts by weight of particulate crosslinked polybutadiene rubber (average particle diameter $d_{50}=0.4$ μm), produced by emulsion polymerisation.

A4 Graft polymer A3+polytetrafluoroethylene.

The tetrafluoroethylene polymer is used as a coagulated mixture of an SAN-graft polymer emulsion as per A3 in water and a tetrafluoroethylene-polymer emulsion in water. The weight ratio of graft polymer emulsion A3 to the tetrafluoroethylene polymer in the mixture is 90 wt. % to 10 wt. %. The tetrafluoroethylene polymer emulsion possesses a solids content of 60 wt. %, the particle size lies between 0.05 and 0.5 μm. The SAN-graft polymer emulsion possesses a solids content of 34 wt. % and a mean latex particle size of 0.4 μm.

Additives B

Extremely finely divided inorganic powder B

B1. 160 g of TiN (average particle diameter 70 nm) are dispersed in 500 ml of water with vigorous stirring (dispersion D1) 1840 g of aqueous dispersion of the graft polymer A3 (36.2% solids) are introduced and the TiN/water dispersion (dispersion D1) is added in 60 min with vigorous stirring. The pH value of the aqueous dispersion of the graft polymer A3 is kept above 9. The dispersion obtained is stirred intensively for 6 h. The latex is then precipitated. A precipitation liquor consisting of 10 1 water, 100 ml concentrated acetic acid and 200 g bitter salt ($MgSO_4.7H_2O$) is introduced for this. The liquor is heated to 30° C. The dispersion is added with stirring, heated to 100° C. and held at this temperature for 10 min. The precipitation is cooled by the addition of water and washed sulphate-free on a table filter. The powder obtained is dried at 70° C. The mixture contains 8 wt. % TiN of 70 mn average diameter.

B2 Production of analogous B1. TiN is replaced by $TiO_2$. The completed mixture contains 7.5 wt. % $TiO_2$. The particle size of the $TiO_2$ used comes to 5 nm.

B2.1 Production of analogous B1. The $TiO_2$ used instead of TiN has a mean particle diameter of 250 nm. Its quantity in the mixture comes to 7.5 wt. %.

B3. Production of analogous B1. TiN is replaced by boehmite ($Al_2O_3.H_2O$). The completed mixture contains 8.0 wt. % boehmite. The particle size of the boehmite comes to 12 nm.

C. Flame retardant m-phenylene-bis-diphenyl phosphate

Production and testing of the moulding compositions according to the invention

The flame-resistant thermoplastic moulding compositions are produced by mixing the ingredients A, B and C in a small mixer of the W 50 E type of the company BRABENDER OHG, Duisberg, at 210° to 230° C., with a speed of 60 $min^{-1}$ and a mixing time of 10 min. The moulding compositions produced were pressed on an electrically heated laboratory press of the POLYSTAT 200 T type of the company SCHWABENTHAN into plates 1.6 mm thick. The pressing temperature came to 200° C., the pressing pressure to 200 bar and the pressing time to 5 min.

The fire behaviour of the samples was measured according to UL-Subj. 94 V on rods with the dimensions 127 mm×12.7 mm×1.6 mm.

The rods were mounted vertically in such a way that the underside of the test specimen was located 305 mm above a strip of bandaging material. Each test rod was ignited individually by means of two successive ignition operations of 10 s duration. The burning properties after each ignition operation were observed and the sample was rated accordingly. A bunsen burner with a 10 mm (3.8 inch) high blue flame of natural gas with a thermal unit of $3.73\times10^4$ $kJ/m^3$ (1000 BUT per cubic foot) was used to ignite the sample.

In order to evaluate the fire behaviour, each test specimen was flame-treated twice for a period of 10 s in each case. After removal of the ignition source the burning time was measured. Five test specimens were used for each test and the 5 burning times measured averaged.

TABLE 1

Composition and properties of the moulding compositions

| Ex. | A1 (wt. %) | A2 (wt. %) | A3 (wt. %) | A4 (wt. %) | B1 (wt. %) | B2 (wt. %) | B2.1 (wt. %) | B3 (wt. %) | C (wt. %) | Burning time (s)[1] |
|---|---|---|---|---|---|---|---|---|---|---|
| 1[2] | 70 | 3 | 8 | 4 | — | — | — | — | 15 | 4.0 |
| 2 | 70 | 5 | 6 | — | 4 | — | — | — | 15 | 2.4 |
| 3 | 70 | 5 | — | — | 10 | — | — | — | 15 | 1.9 |
| 4 | 70 | 5 | 6 | — | — | 4 | — | — | 15 | 1.1 |
| 5 | 70 | 5 | — | — | — | 10 | — | — | 15 | 0.5 |
| 6 | 70 | 5 | 6 | — | — | — | — | 4 | 15 | 0.6 |
| 7 | 70 | 5 | — | — | — | — | — | 10 | 15 | 0.4 |
| 8[2] | 70 | 5 | 6 | — | — | — | 4 | — | 15 | 6.1 |
| 9[2] | 70 | 5 | — | — | — | — | 10 | — | 15 | 4.4 |

[1]Fire behaviour: mean burning time in seconds
[2]Comparison tests

It emerges clearly from Examples 2 to 7 according to the invention that a combination of extremely finely divided inorganic powder and a phosphate as flame retardant leads to a significant reduction in the burning times of the polycarbonate/ABS moulding compositions. Various metal compounds such as TiN, $TiO_2$ or $Al_2O_3.H_2O$ (boehmite) are suitable for this purpose.

A coarse-particle inorganic powder (comparison example 8) does not show this effect.

We claim:

1. A thermoplastic moulding composition consisting essentially of:
    A. A thermoplastic polycarbonate which may be partly or wholly replaced by an aromatic polyester carbonate or partly replaced by at least one thermoplastic homo- or copolymer;
    B. 0.01 to 50 wt. %, based on the weight of component A, of an extremely finely divided inorganic powder having a mean particle diameter of 0.1 to 100 nm, the inorganic powder consisting of one or more metals or metal compounds of one or more metals of the 1st to 5th main group or 1st to 8th sub-group of the periodic table; and
    C. 0.1 to 50 wt. %, based on the weight of component A, of a flame retardant.

2. The thermoplastic moulding composition according to claim 1, wherein the metal or metal compound of component B is selected from a metal of the 2nd to 5th main group or 4th to 8th sub-group of the periodic table.

3. The thermoplastic moulding composition according to claim 1, wherein the metal or metal compound of component B is selected from a metal of the 3rd to 5th main group or 4th to 8th sub-group of the periodic table.

4. The thermoplastic moulding composition according to claim 2, wherein the metal compound of component B comprises an oxide of the metal of the 3rd to 5th main group or 4th to 8th sub-group of the periodic table.

5. The thermoplastic moulding composition according to claim 1, wherein the metal compound of component B comprises the metal and an element selected from the group consisting of oxygen, carbon, nitrogen, hydrogen, sulfur, silicon, and a mixture thereof.

6. The thermoplastic moulding composition according to claim 1, wherein the metal compound of component B is TiN, $TiO_2$, $SiO_2$, $SnO_2$, WC, ZnO, $ZrO_2$, an iron oxide, an aluminum oxide, an aluminum phosphate, or a mixture thereof, optionally doped with another element.

7. The thermoplastic moulding composition according to claim 6, wherein the metal compound of component B is the aluminum oxide, $TiO_2$, or TiN.

8. The thermoplastic moulding composition according to claim 7, wherein the aluminum oxide is $Al_2O_3$ or boehmite.

9. The thermoplastic moulding composition according to claim 1, wherein the extremely finely divided inorganic powder has a mean particle diameter of 1 to 50 nm.

10. The thermoplastic moulding composition according to claim 1, wherein the at least one thermoplastic homo- or copolymer of component A is of an ethylenically unsaturated monomer.

11. The thermoplastic moulding composition according to claim 10, wherein the at least one thermoplastic homo- or copolymer of component A is ethylene, propylene, vinyl acetate, styrene, 2-methyl styrene, styrene substituted in the ring, acrylonitrile, methacrylonitrile, methyl methacrylate, maleic acid anhydride, N-substituted maleinimide, 1-3-butadiene, isopropene, $C_1$–$C_{18}$ alkyl acrylate, and methacrylate.

12. The thermoplastic moulding composition according to claim 11, wherein the at least one thermoplastic homo- or copolymer of component A is a) a rubber-free vinyl polymer, b) a rubber-containing vinyl polymer, or c) a mixture thereof.

13. The thermoplastic moulding composition according to claim 12, wherein the at least one thermoplastic homo- or copolymer of component A contains:
    (a) 50 to 98 wt. % of styrene, α-methyl styrene, styrene substituted in the ring, methyl methacrylate, or a mixture thereof, and
    (b) 2 to 50 wt. % of acrylonitrile, methyacrylonitrile, methyl methacrylate, maleic acid anhydride, N-substituted maleinimide, or a mixture thereof.

14. The thermoplastic moulding composition according to claim 12, wherein the rubber-containing vinyl polymer of component A is a diene rubber, a polyacrylate rubber, or a silicone rubber.

15. The thermoplastic moulding composition according to claim 12, wherein the rubber-containing vinyl polymer of component A comprises a graft polymer.

16. The thermoplastic moulding composition according to claim 15, wherein component A is a mixture of the thermoplastic polycarbonate and the graft polymer.

17. The thermoplastic moulding composition according to claim 15, wherein the graft polymer of component A comprises 5 to 95 wt. % of a mixture of:
    (1) 50 to 95 wt. % of styrene, α-methyl styrene, styrene substituted in a halogen or methyl ring, methyl methacrylate, or a mixture thereof;
    (2) 5 to 50 wt. % of acrylonitrile, methacrylonitrile, methyl methacrylate, maleic acid anhydride, $C_1$–$C_4$- alkyl- or phenyl-N-substituted maleinimide, or a mixture thereof; and (3) 5 to 95 wt. % of a rubber polymer having a glass transition temperature of less than −10° C.

18. The thermoplastic moulding composition according to claim 1, wherein the flame retardant of component C comprises a halogen-free compound.

19. The thermoplastic moulding composition according to claim 1, wherein the flame retardant of component C comprises a phosphorous compound of formula (VIII):

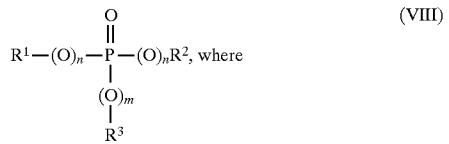

$R^1$, $R^2$, and $R^3$, independently of one another, are an optionally halogenated $C_1$–$C_8$ alkyl, an optionally halogenated and/or alkylated $C_5$–$C_6$ cycloalkyl, or an optionally halogenated and/or alkylated $C_6$–$C_{30}$ aryl, and n and m, independently of one another, are 0 or 1.

20. The thermoplastic moulding composition according to claim 1, wherein the flame retardant of component C comprises a dimeric or oligomeric phosphate having a molecular weight of less than 2000 g/mol.

21. The thermoplastic moulding composition according to claim 12, wherein the rubber-containing vinyl polymer of component A is an ethylene-propylene-diene rubber.

* * * * *

UNITED STATES PATENT AND TRADEMARK OFFICE
CERTIFICATE OF CORRECTION

PATENT NO. : 5,849,827
DATED      : December 15, 1998
INVENTOR(S): Michael Bodiger, et al.

It is certified that error appears in the above-identified patent and that said Letters Patent is hereby corrected as shown below:

Column 12, line 31, (claim 11, line 4), change "2-methyl styrene" to -- α-methyl styrene --.

Column 11, line 48 (claim 3, line 2), change "claim 1" to -- claim 2 --.

Column 11, line 52 (claim 4, line 2), change "claim 2" to -- claim 3 --.

Signed and Sealed this

Thirtieth Day of November, 1999

Attest:

Q. TODD DICKINSON

*Attesting Officer*      *Acting Commissioner of Patents and Trademarks*